Figure 1:
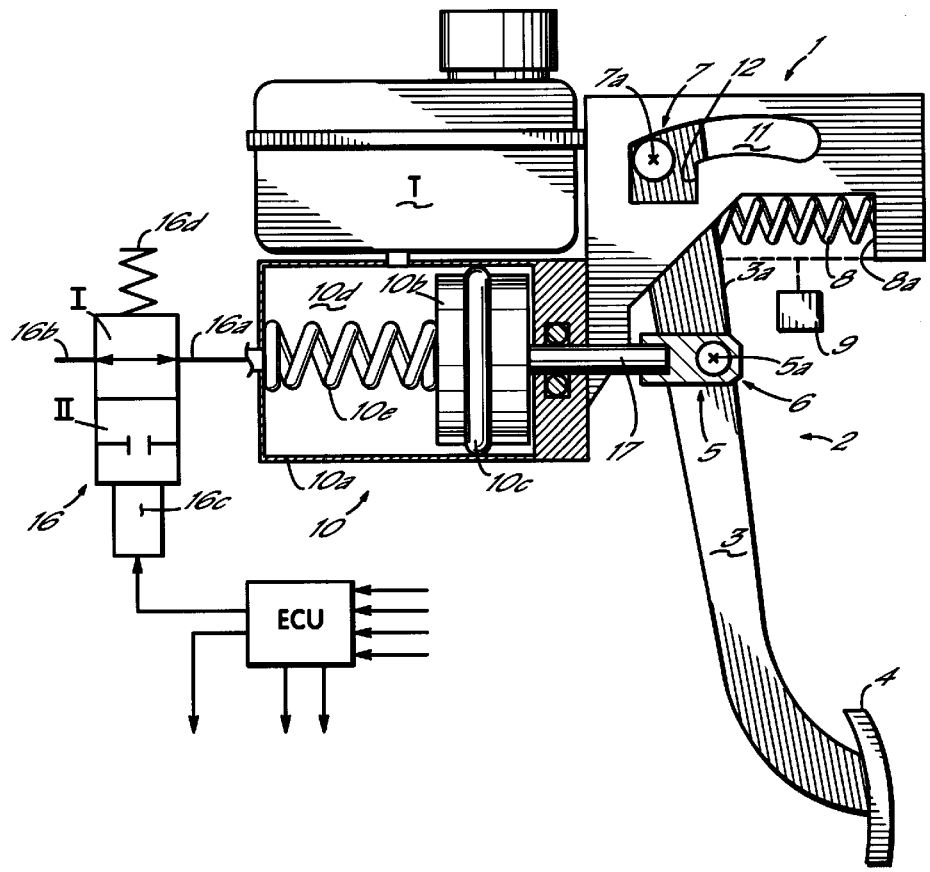

United States Patent
Poertzgen et al.

[19]

[11] Patent Number: 5,865,510
[45] Date of Patent: Feb. 2, 1999

[54] BRAKE PEDAL ACTUATOR FOR MOTOR VEHICLE AND ACTUATION UNIT THEREFOR

[75] Inventors: Gregor Poertzgen, Koblenz, Germany; Peter Martin, Sutton Coldfield, Great Britain

[73] Assignee: Lucas Industries public limited company, West Midlands, Great Britain

[21] Appl. No.: 727,359

[22] Filed: Oct. 8, 1996

[30] Foreign Application Priority Data

Oct. 11, 1995 [DE] Germany .......................... 953 07 221.2

[51] Int. Cl.⁶ .............................. B60T 11/32; B60T 8/34
[52] U.S. Cl. ........................................... 303/113.4; 60/582
[58] Field of Search ............................. 303/3, 15, 113.4, 303/114.1, 114.2, 115.2, 155; 188/353, 355, 358, 359, 360; 60/550, 551, 566, 582

[56] References Cited

U.S. PATENT DOCUMENTS

| | | | |
|---|---|---|---|
| 2,791,203 | 5/1957 | Ayers, Jr. | 60/551 |
| 3,382,676 | 5/1968 | Tenniswood | 60/551 |
| 3,713,292 | 1/1973 | Huffman | 188/359 |
| 3,766,342 | 10/1973 | Stadelmann . | |
| 4,078,385 | 3/1978 | Zabadneh | 60/550 |
| 4,206,605 | 6/1980 | Mehren et al. | 60/582 |
| 4,603,918 | 8/1986 | Leiber et al. | 188/359 |
| 4,914,917 | 4/1990 | Schonlau | 303/114.1 |
| 5,350,225 | 9/1994 | Steiner et al. | 303/113.4 |
| 5,480,222 | 1/1996 | Cooney | 303/114.1 |
| 5,563,355 | 10/1996 | Pluta et al. | 303/3 |
| 5,567,021 | 10/1996 | Gaillard | 188/358 |

FOREIGN PATENT DOCUMENTS

| | | |
|---|---|---|
| 2052401 | 4/1972 | Germany . |
| 2156736 | 5/1973 | Germany . |

*Primary Examiner*—Robert J. Oberleitner
*Assistant Examiner*—Chris Schwartz
*Attorney, Agent, or Firm*—Wood, Herron & Evans, L.L.P.

[57] ABSTRACT

A brake pedal (1) for actuation of a brake cylinder (10) of a motor vehicle, comprises a lever (2), having at an end portion of one lever (3) a stepping plate (4) for actuation by a driver, and an articulation location (5) for introducing actuation forces into the brake cylinder (10), characterized in that the lever (2) comprises a first rotational axis (6) and a second rotational axis (7), the lever (2) rotating about the first rotational axis (6) during a normal actuation, and the lever (2) rotating about the second rotational axis (7) during an emergency actuation.

8 Claims, 4 Drawing Sheets

BRAKE PEDAL ACTUATOR FOR MOTOR VEHICLE AND ACTUATION UNIT THEREFOR

Brake pedal means for actuation of a brake cylinder of a motor vehicle and an actuation unit for an electronic brake system for a motor vehicle using the brake pedal means

DESCRIPTION

The present invention is related to a brake pedal means for actuation of a brake cylinder of a motor vehicle. More precisely, the invention is related to a brake pedal means comprising a lever means having a stepping plate at an end portion of one lever for actuation of said brake pedal means by a driver and an articulation location for introducing actuation forces into the brake cylinder. Furthermore, the present invention relates to an actuation unit for an electronic brake system for a motor vehicle.

Brake pedal means of differing designs are well known in the art. However, in so-called "brake by wire" brake systems, there are various problems with respect to suitable brake pedal means. In brake by wire systems the actuation of the brake pedal by a driver is sensed electronically by a sensor means coupled to the brake pedal. The signal derived from said sensor means is fed into an electronic control unit (ECU). In said electronic control unit the input signal is processed and an electronical output signal is provided to activate an electromechanical actuator which operates on brake pads at the wheels.

For safety reasons it is necessary to provide a path parallel to the brake by wire path described above. This parallel path is from the brake pedal means via a fluid brake cylinder to an hydraulic actuator operating the brake pads at the wheels in case the brake by wire path fails.

Such a system is called a "push-through-system". During a normal actuation, where the brake by wire path is operable, the hydraulic piston is inoperative. During an emergency actuation where the brake by wire path is inoperative, the signal from the sensor means is ignored or not present, the brake pedal is "pushing-through" the brake cylinder and feeds hydraulic fluid to the brake pads at the vehicle wheels in order to decelerate the vehicle.

The problem underlying the present invention is to provide a brake pedal means suitable for use during an emergency actuation as well as during a normal actuation.

To solve this problem, a lever means of the brake pedal means outlined above comprises a first rotational axis and a second rotational axis, wherein said lever means rotates about said first rotational axis during a normal actuation, and said lever means rotates about said second rotational axis during an emergency actuation.

In order to simulate the characteristics of a conventional brake system wherein the brake pedal operates via a brake booster on a brake cylinder, the lever means is coupled to a spring means, whereby during a normal operation actuation forces are introduced against the spring force of that spring means. Preferrably, the spring means is designed such that it has a progressive spring characteristic in order to provide the same feeling and appearence as a conventional brake system to the driver.

Further, the lever means is coupled to at least one sensor means for sensing at least one value representative for said normal actuation. This value can be the path of the brake pedal, the force applied to the pedal, the speed of the pedal being pressed down, the increase of the force, and the angle or the angular speed the brake pedal is rotated around the first rotational axis.

According to the present invention, the lever means is supported such that during a normal actuation said first rotational axis is situated near or essentially in said articulation location for introducing actuation forces into said brake cylinder.

Moreover, the lever means is supported such that during a normal actuation the first rotational axis of said lever means being fixed with respect to the brake cylinder.

Further, the lever means is mounted such that during an emergency actuation the second rotational axis of said lever means being fixed with respect to the brake cylinder.

Also, the lever means is mounted such that during an emergency actuation the articulation location for introducing actuating forces into the brake cylinder is moved towards said brake cylinder.

In a further embodiment, the lever means is mounted such that the second rotational axis is mounted movably in a guide means such that the second rotational axis upon initiation of an emergency actuation is shifted against a support, and upon initiation of a normal actuation the second rotating axis is moved in a guide, along which the second rotating axis is movable during said normal actuation.

In another embodiment, the lever means comprises two parts which are rotatably connected to each other by a third rotating axis, wherein the rotatability of said two parts against each other is limited by an abutment.

The abutment may be mounted at one of said two parts of at a location which is non moving with respect to the brake pedal means, e.g. a part of the chassis of the vehicle.

Preferably, the sensor means senses a value representing the torque of one of said two parts about the third rotating axis.

In another embodiment, the third rotational axis is identical or essentially identical to said second rotational axis.

The brake pedal according to the present invention also encompasses that one of said two parts comprises a fixed rotational axis about which the lever means rotated during an emergency actuation.

The third rotational axis may be located near or essentially in the articulation location for introducing actuation forces into the brake cylinder. Moreover, the third rotational axis may be mounted in said articulation location for introducing actuation forces into the brake cylinder.

The present invention is also related to an actuation unit for an electronic brake system for a motor vehicle having a brake pedal means, and a hydraulic brake cylinder/piston means feeding hydraulic fluid into the brake system during an emergency actuation.

The hydraulic brake cylinder/piston means comprises a valve means connecting said brake cylinder/piston means with the brake system during an emergency actuation and separates said brake cylinder/piston means from said brake system during a normal actuation.

Figure 2:
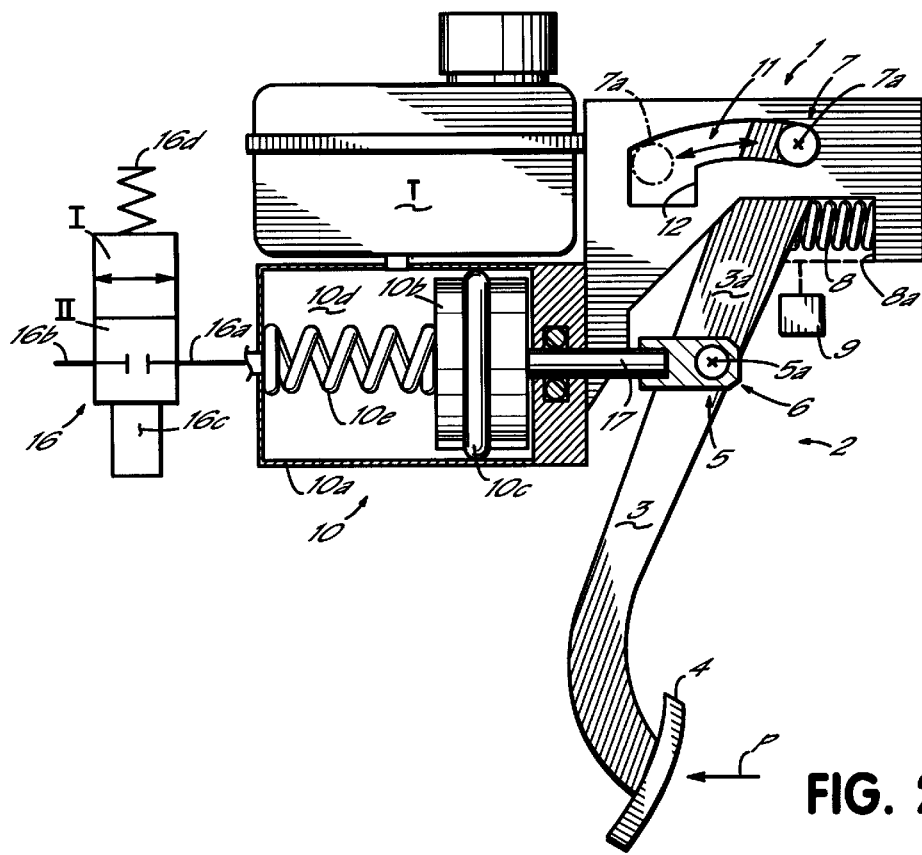
Figure 3:
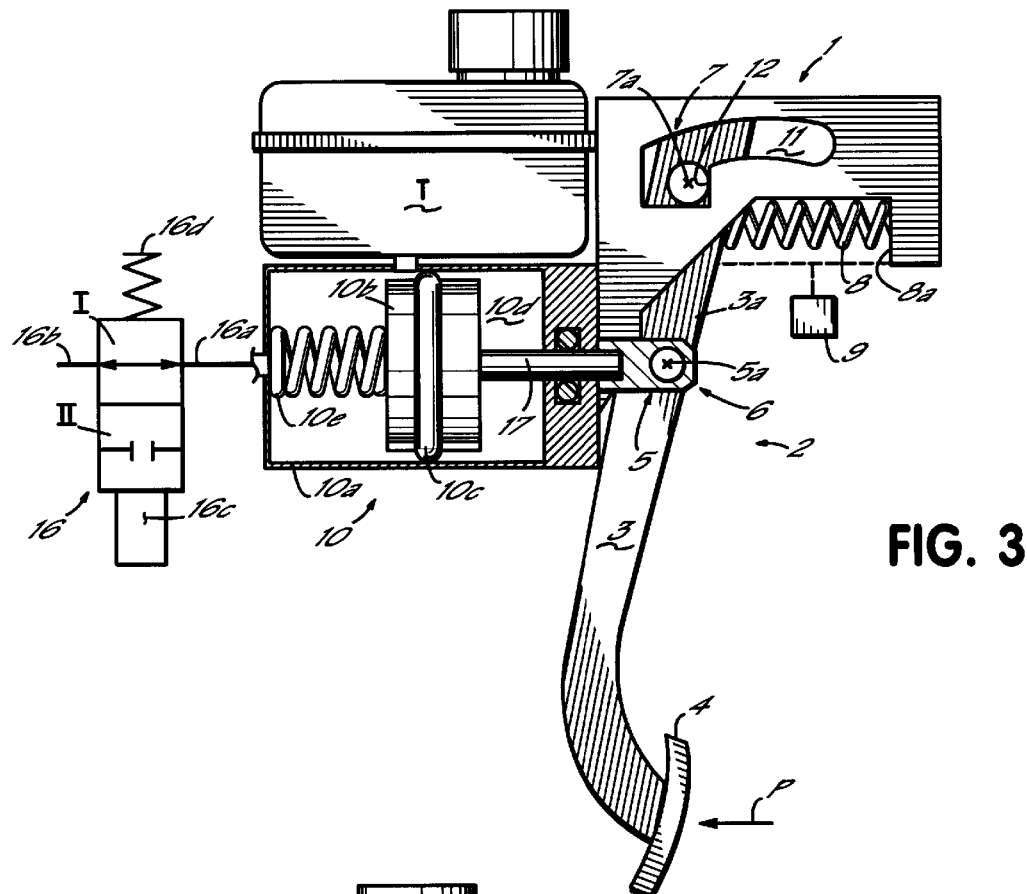
Figure 4:
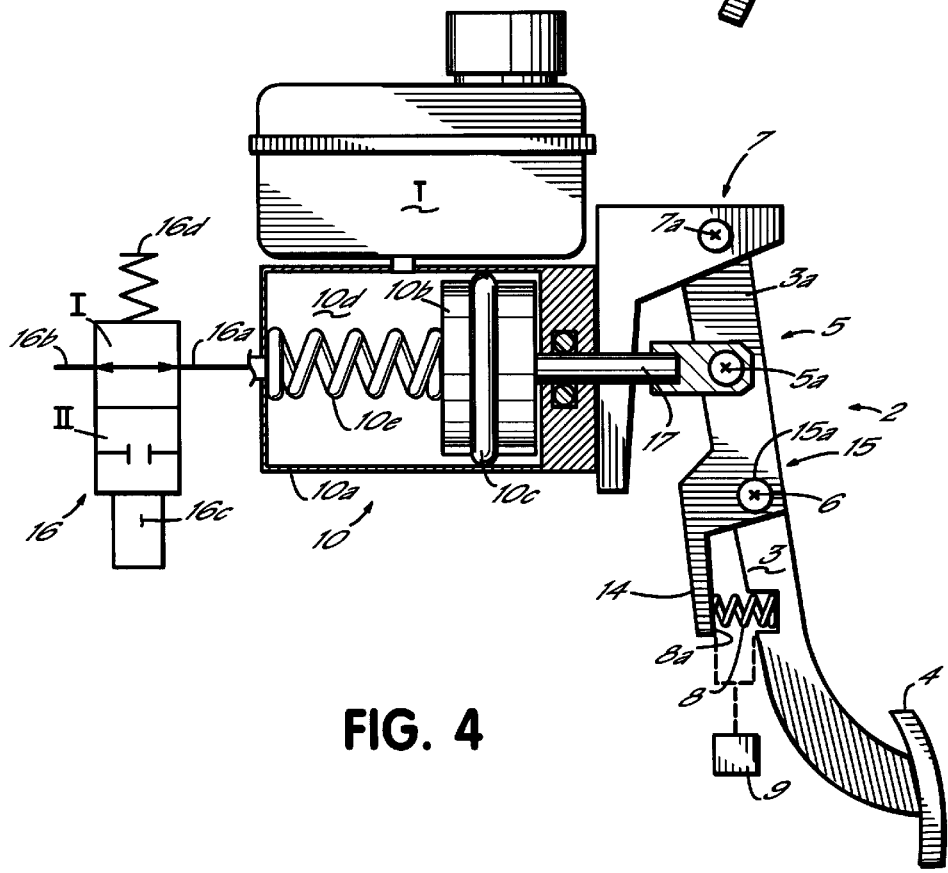
Figure 5:
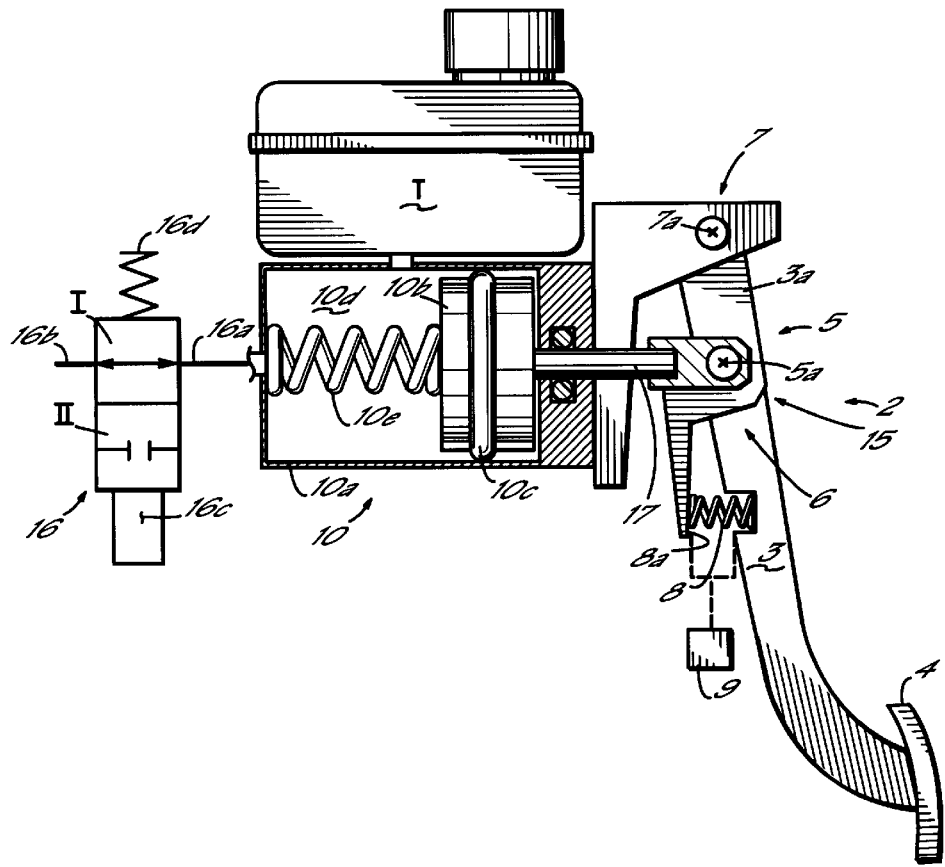
Figure 6:
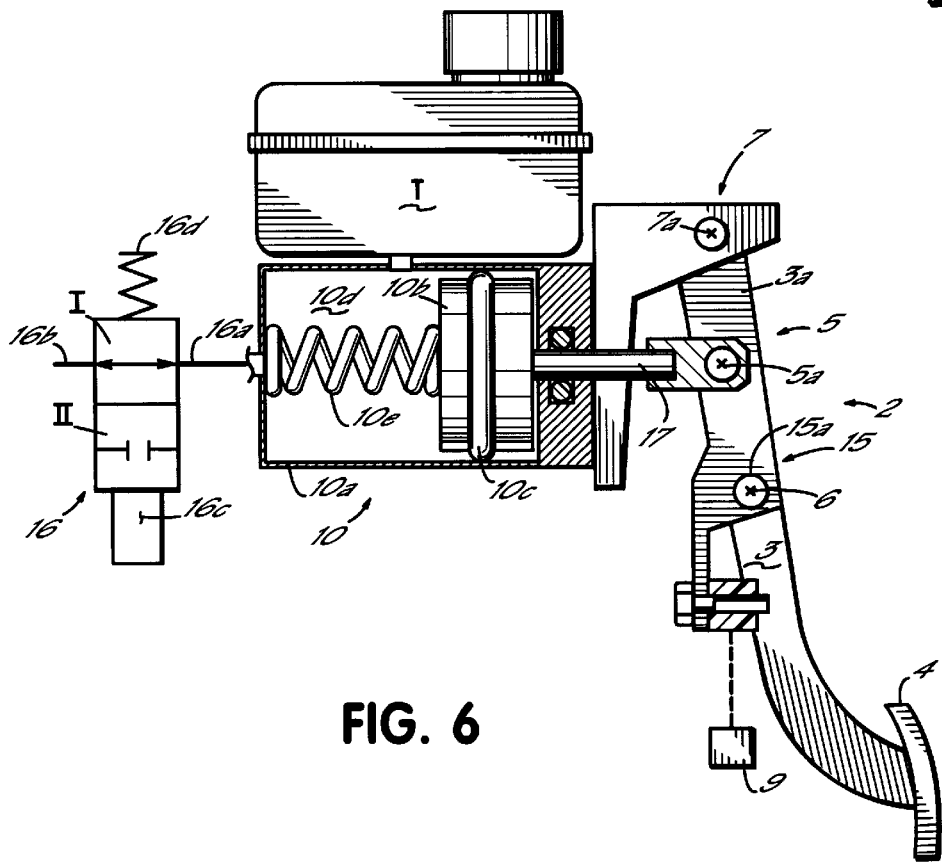
Figure 7:
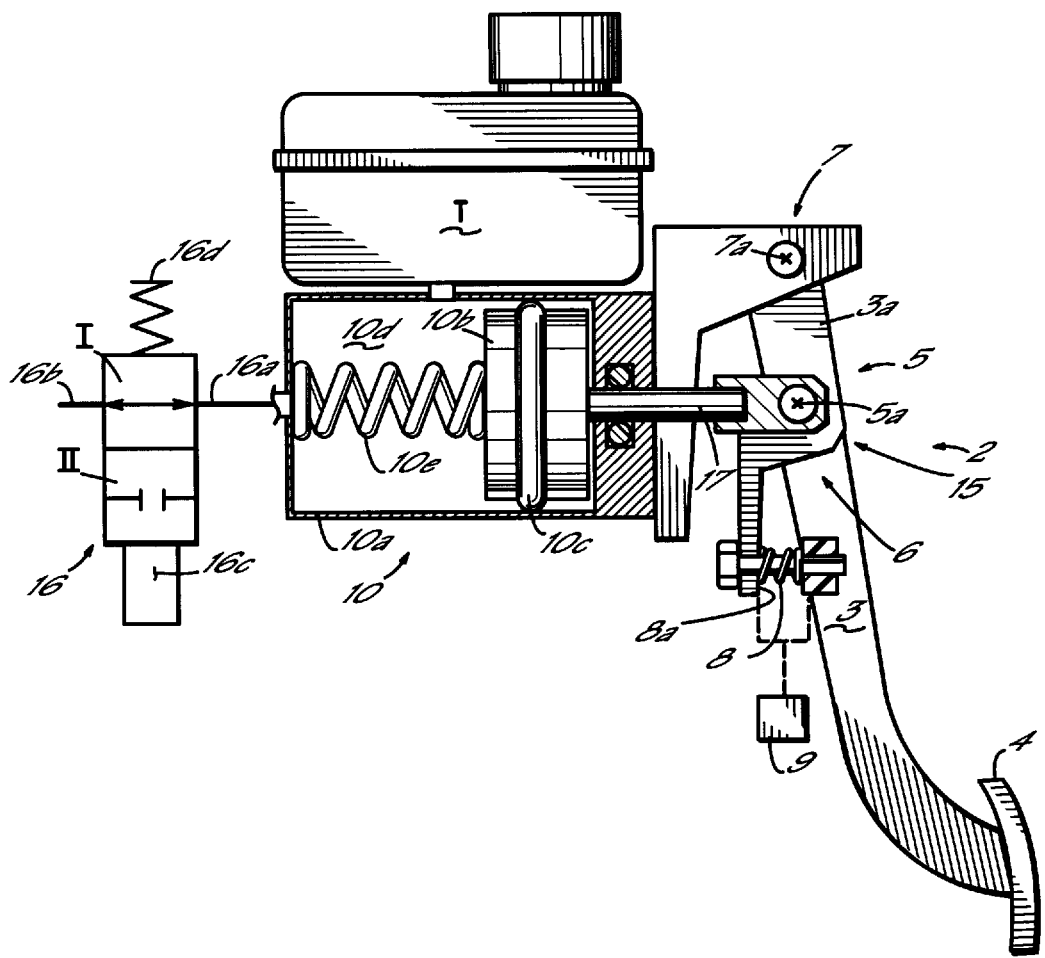

Further features, characteristics and advantages of the subject matter of the present invention will become apperarent to a person skilled in the art when studying the following description of presently preferred embodiments referring to the enclosed drawings, wherein FIG. 1 shows an actuation unit for an electronic brake system for a motor vehicle including a brake pedal means for actuation of a brake cylinder according to the present invention in an unoperated position, FIG. 2 shows the embodiment of FIG. 1 in an operated position resulting from a normal actuation, FIG. 3 shows the embodiment of FIG. 1 in an actuated position resulting from an emergency actuation, FIG. 4 shows a schematic drawing of a further embodiment of an actuation unit for an electronic brake system for a motor vehicle including a brake pedal means for actuation of a brake cylinder in an unoperated position, FIG. 5 shows a schematic drawing of a further embodiment of an actuation unit for an electronic brake system for a motor vehicle including a brake pedal means for actuation of a brake cylinder in an unoperated position, FIG. 6 shows a schematic drawing in a further embodiment of an actuation unit for an electronic brake system for a motor vehicle including a brake pedal means for actuation of a brake cylinder in an unoperated position, and FIG. 7 shows a schematic drawing of yet another embodiment of an actuation unit for an electronic brake system for a motor vehicle including a brake pedal means for actuation of a brake cylinder in an unoperated position.

FIG. 1 shows an actuation unit comprising a brake pedal means 1 and a hydraulic brake cylinder/piston means 10 for feeding hydraulic fluid into a (not shown) brake system during an emergency actuation. The brake cylinder/piston means 10 is formed of a cylinder 10a housing hydraulic fluid and a piston 10b which is axially movable in the cylinder 10a. An O-ring sealing 10c situated in an annular groove along the circumference of the piston lob prevents hydraulic fluid housed in a chamber 10d from leaking out of the cylinder/piston means 10. A spring 10e is mounted in the chamber 10d to force the piston 10b into its rest position shown in FIG. 1. The hydraulic chamber 10d is connected to a fluid tank T. The cylinder 10a is connectable to an electromagnetic valve means 16. The valve means 16 is a electromagnetic valve having two positions, a first position I, where an inlet port 16a of the valve 16 is in fluid connection with an outlet 16b of the valve means 16 and a second position II where the inlet port 16a is separated from the outlet port 16b. Upon energization of an electromagnetic means 16c the electromagnetic valve 16 is forced into the second position II against the force of a spring means 16d. Upon de-energization of the electromagnetic valve 16, the spring means 16d forces the valve 16 into the first position I. The second position II where the chamber 10d is separated from the brake system is the normal actuation position, whereas the first position I is the emergency actuation position, where the hydraulic fluid from the chamber 10d is fed into the brake system via the valve means 16.

The embodiment of the brake pedal means 1 for actuation of the brake cylinder 10 during an emergency actuation or for a normal actuation has the following set-up:

A lever means 2 has one lever 3 which is provided with a stepping plate 4 at one end portion thereof for actuation by a driver. The lever means 2 is provided with an articulation location 5 formed by a pin 5a connecting the lever means 2 via an actuation rod 17 to the piston 10b of the brake cylinder/piston means 10.

During a normal actuation of the brake pedal means 1, when the chamber 10d of the brake cylinder/piston means 10 is separated from the (not shown) brake system by the electromagnetic valve means 16, the piston 10b of the brake cylinder/piston means 10 and the actuation rod 17 are essentially non-movable with respect to the cylinder 10a of the brake cylinder/piston means 10. So the lever means 2 rotates about the pin 5a acting as a first rotational axis 6. This means that during a normal actuation the first rotational axis 6 is identical with the articulation location for introducing actuation forces into said brake cylinder 10.

At an end portion of a second lever 3a of the lever means 2 a second rotational axis 7 is formed by a pin 7a protruding from the end portion of the lever 3a. The pin 7a forming the second rotational axis 7 is movably held in a guide means 11 which has an arcuate shape such that a reciprocting movement of the pin 7a is possible along the extension of the guide means 11 (see FIG. 2). During such a reciprocating movement of the pin 7a in the guide means 11, a spring means 8 mounted between the lever 3a and an abutment 8a is compressed (see FIG. 2) in an operated end position or released (see FIG. 1) in an unoperated end position as shown in FIG. 1. The movement of the lever 3a can be sensed by a sensor means 9 sensing the path of a lever 3a vis-à-vis the abutment 8a. It is also possible to sense the forces acting on the spring means 8 by the lever 3a. Such a sensor means may be more expensive. However, if the spring means 8 is mounted under pretension between the lever 3a and the abutment 8a, a failure or rupture of the spring means 8 can be detected by the force sensor means.

An emergency actuation will occur due to e.g. a failure of the electrical power supply or of the electronic control uit ECU (not shown in great detail). In that case the electromagnetic valve means 16 is forced into its first position I by the spring means 16d. Whenever the valve means 16 is in its first position where a fluid connection between the brake cylinder 10 and the (not shown) brake system is present via the valve inlet port 16a and the valve outlet port 16b, and a driver actuates the brake pedal by stepping on the stepping plate 4 in the direction of the arrow P, the pin 7a is moved against a rest or support 12 (see FIG. 3) while at the same time the articulation location 5 for introducing actuation forces into the brake cylinder 10 is moved towards the brake cylinder 10. Thus, the actuation rod 17 pushes the piston 10b against the force of the spring means 10e within the chamber 10d and feeds hydraulic fluid into the brake system via the electromagnetic valve means 16. Thereby, an emergency braking operation is carried out.

The forces required to compress the spring means 10e within the hydraulic chamber 10d and the forces required initially to feed hydraulic fluid into the brake system are less than the forces required to cause an initial compression of the spring means 8. Therefore, the pin 7a is moved against the support 12 (see FIG. 3) and the articulation location 5 (pin 5a) is moved towards the brake cylinder/piston means 10.

FIG. 4 shows a further embodiment of the subject matter of the present invention. Identical reference numerals indicate similar, identical or equivalent parts as in FIGS. 1 to 3. One difference vis-à-vis FIG. 1 is the fact that the lever means 2 is formed of two parts 3, 3a. The two parts 3, 3a are rotatably connected to each other by a third rotational axis 15. This third rotational axis 15 is identical to the first rotational axis 6 in this embodiment of FIG. 4. However, this is not necessarily required. One of the two parts 3, 3a is provided with a protrusion forming an abutment 14. The rotatability of the two parts 3, 3a against each other is limited by this abutment 14. The spring means 8 is unloosably mounted between the abutment 14 and the lever 3, such that actuation forces applied by a driver to the stepping plate 4 cause a compression of the spring means 8. The path of the lever 3 vis-à-vis the abutment 14 is measured by a sensor means 9. Similarly as in the embodiment of FIG. 1 to 3, it is also possible to detect the force applied to the spring means 8 when applying force to the stepping plate 4.

The lever 3 is rotating around the third rotating axis 15 formed by a pin 15a protruding from the arm 3. If however, as shown in FIG. 4, the valve means 16 connects the chamber 10d to the brake system, an actuation of the brake pedal by a driver causes the lever 3 to rotate around the third rotational axis maximally until the lever 3 abuts the abutment 8a.

Depending on the spring characteristics of the spring means 8 on the one side and the spring characteristics of the spring means 10e, the lever dimensions of the lever means 2, the resistance of the hydraulic system etc. on the other side causes the articulation location 5 to move towards the cylinder 10 and thereby to push the actuation rod 17 which in turn causes the piston 10b to compress the hydraulic chamber 10d. Consequently, hydraulic fluid is fed into the brake system via the electromagnetic valve means 16. During this operation, the lever means 2 rotates around the second rotational axis 7 which is in a fixed relationship vis-à-vis the brake cylinder/piston means 10.

The embodiment of FIG. 5 is different from the embodiment of FIG. 4 in as much as the articulation location 5, the second rotational axis 7 and the third rotational axis 15 are identical. In all other structural features, the embodiments of FIG. 4 and FIG. 5 are virtually the same. A geometrical difference lies in the fact that the lever 3 of FIG. 4 is shorter than the lever 3 of FIG. 5.

In the embodiment of FIG. 6, the main difference vis-à-vis the embodiment of FIG. 4 is a force sensor means 9 replacing the spring means 8. In this embodiment, there is no movement of the stepping plate 4 and the lever means 2 during a normal actuation of the brake pedal means. Moreover, there is no rotational movement between the two parts 3, 3a. Although the force sensor means 9 senses the torque of the lever 3 around the third rotational axis 15, there is esentially no movement of the stepping plate. Only during an emergency operation the lever means 2 is pivoting around the second rotational axis 7. Again, during an emergency actuation the articulation location 5 is moving towards the brake cylinder/piston means 10. Thereby, the actuation rod 17 pushes the piston 10b against the force of the spring means 10e and the hydraulic fluid in the chamber 10d is fed under pressure into the brake system.

The embodiment of FIG. 7 is similar to the embodiment of FIG. 5 with the difference that a force sensor means 9 is provided instead of a sensor detecting the path of the lever 3 relative to the abutment 14. In this embodiment, the spring means 8 has the advantage of providing a moving brake pedal although during the normal actuation situation. Therefore, the driver using this system has very much the same feeling as with a conventional brake pedal means in this embodiment.

I claim:

1. A brake pedal (1) for actuation of a brake cylinder (10) of a motor vehicle comprising a lever (2), having at an end port (3) a stepping plate (4) for actuation by a driver, and an articulation location (5) for introducing actuation forces into the brake cylinder (10), characterized in that the lever (22) comprises a first rotational axis (6) and a second rotational axis (7), said lever (2) rotating about said first rotational axis (6) during a normal actuation, and said lever (2) rotating about said second rotational axis (7) during an emergency actuation further characterized in that the lever (2) is mounted such that the second rotational axis (7) is movable in a guide means (11) such that upon initiation of an emergency actuation, the second rotational axis (7) is shifted against a support (12), and upon initiation of a normal actuation the second rotating axis (7) is moved in a guide (13), along which the second rotating axis (7) is movable during said normal actuation.

2. An actuation unit for an electronic brake system for a motor vehicle, characterized by a brake pedal according to claim 1, and a hydraulic brake cylinder/piston (10) feeding hydraulic fluid into the brake system during an emergency actuation.

3. An actuation unit according to claim 2, characterized in that the hydraulic brake cylinder/piston 10 comprises a valve (16) connecting said brake cylinder/piston (10) with the brake system during an emergency actuation and separates said brake cylinder/piston from said brake system during a normal actuation.

4. The brake pedal actuator (1) according to claim 1, characterized in that said lever (2) is supported such that during a normal actuation said first rotational axis (6) is situated near or essentially in said articulation location (5) for introducing actuation forces into said brake cylinder (10).

5. The brake pedal actuator (1) according to claim 1, characterized in that the lever (2) being supported such that during a normal actuation the first rotational axis (6) of said lever (2) is fixed with respect to the brake cylinder (10).

6. The brake pedal actuator (1) according to claim 1, characterized in that the lever (2) is coupled to a spring (8), whereby during a normal operation actuation forces are introduced against the spring force of that spring (8).

7. The brake pedal actuator (1) according to claim 1, characterized in that the lever (2) being mounted such that during an emergency actuation the articulation location (5) for introducing actuating forces into the brake cylinder (10) is moved towards said brake cylinder (10).

8. The brake pedal actuator (1) according to claim 1, characterized in that the lever (2) being coupled to at least one sensor (9) for sensing at least one value ($\alpha$, s, F, ds/dt, dF/dt) representative for said normal actuation.

* * * * *